INVENTORS
MARSHALL B. MILLER,
MELVIN H. FITZWATER &
ALPHIE A. ZOOK
BY *Sherman Levy*
ATTORNEY United States Patent Office
3,400,725
Patented Sept. 10, 1968

3,400,725
AUTOMATIC NON-FREEZING, HOT-WATER-SAVING, PURGE SYSTEM FOR VEHICLE WASHING APPARATUS
Marshall B. Miller and Melvin H. Fitzwater, both of Broadway, Va. 22815, and Alphie A. Zook, 1236 Upland Drive, Harrisonburg, Va. 22801
Filed July 21, 1966, Ser. No. 566,906
5 Claims. (Cl. 134—57)

ABSTRACT OF THE DISCLOSURE

An automatic non-freezing hot-water and purge system for vehicle washing apparatus which has unique features for economy, namely, that of hot-water-saving and fuel saving, and wherein, in accordance with the present invention there is provided a water purge system adapted to car wash assemblies.

---

This invention relates to car washing systems or apparatus, and more particularly, to coin-operated car washing devices.

An object of the present invention is to provide a vehicle-washing apparatus which includes a mechanism that permits year-round operation and use of the car washing system even in sub-freezing climates or weather conditions due to the fact that the present invention prevents the water from freezing, and, in addition, assures that there will be a saving of the water used in the purge system.

Another object is to provide a car washing apparatus wherein the warm water is returned so that the same can be reused or used over and over again whereby there will be important savings of fuel as well as substantial economies in the use and operation of the present invention.

A still further object of the present invention is to provide a car wash system which includes or incorporates a water purge system having a suitable control means incorporated therein and wherein the system and mechanism operates automatically, the present invention assuring that the water is returned to a central position for reuse so as to save all of the water.

Another object of the present invention is to provide a control mechanism which can be used with any car wash system, and wherein the present invention permits year-round operation even in freezing weather or sub-freezing climates and prevents freezing in the lines and parts and by saving the water used in the purge systems, and wherein the present invention minimizes waste water and assures that there will be a savings in fuel costs for heating the water, the present invention being also useful and suitable for any kind of car wash apparatus so that the same is not limited to coin-operated car wash units, the present invention including an outside thermostat that is actuated when the outside temperature drops below a certain level so that the control mechanism is automatically actuated.

Another object is to provide an apparatus of the character described that may be used speedily and with precision by even inexperienced operators.

A still further object of the present invention is to provide a vehicle-washing apparatus which is economical to manufacture and operate, efficient in operation and which is both rugged in structure and foolproof in use.

These and other objects of the present invention will become apparent from a reading of the specification and claims, together with the accompanying drawing wherein like parts are referred to and indicated by like reference characters and wherein:

Figure 1:
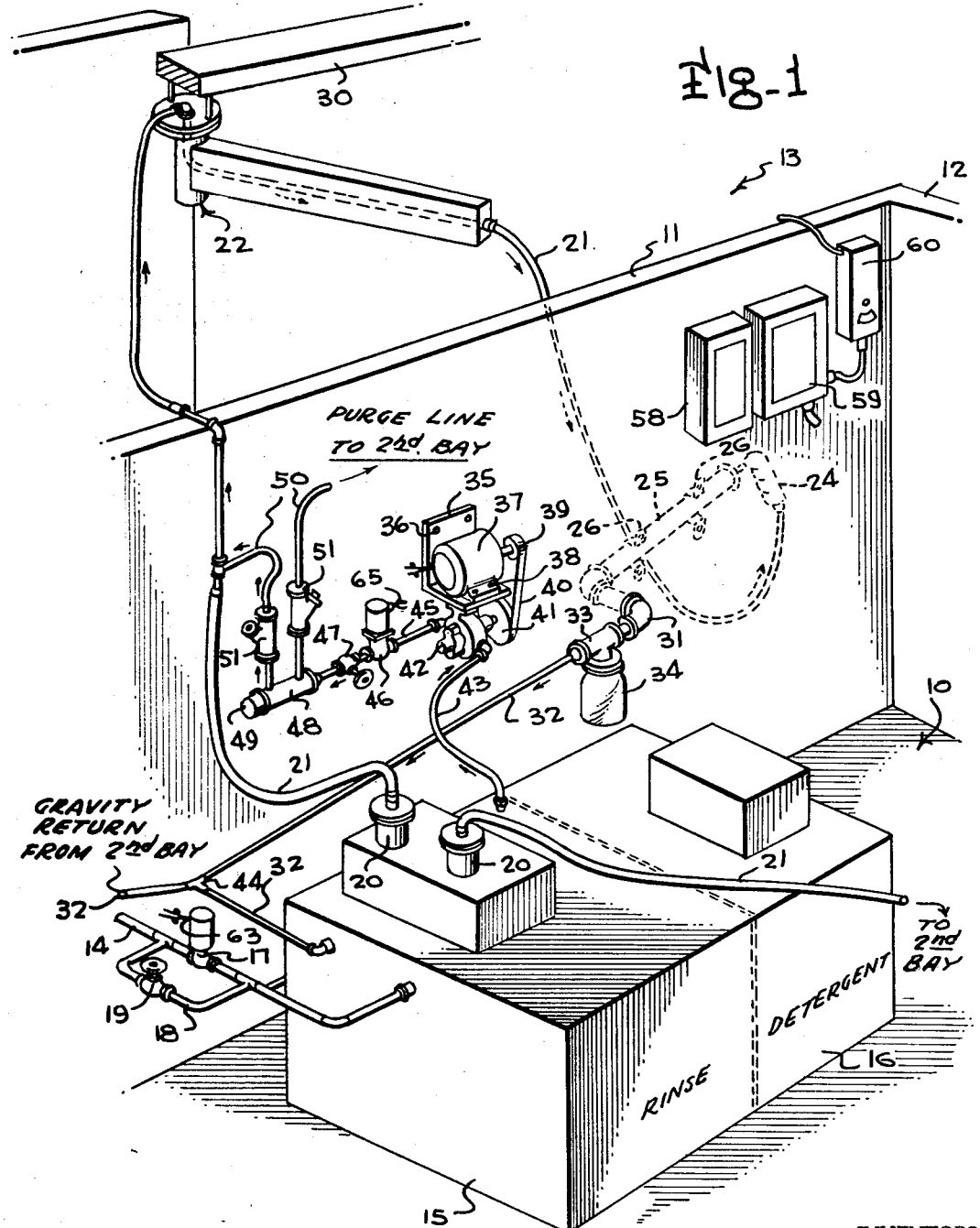
FIGURE 1 is a perspective view illustrating the present invention.
Figure 2:
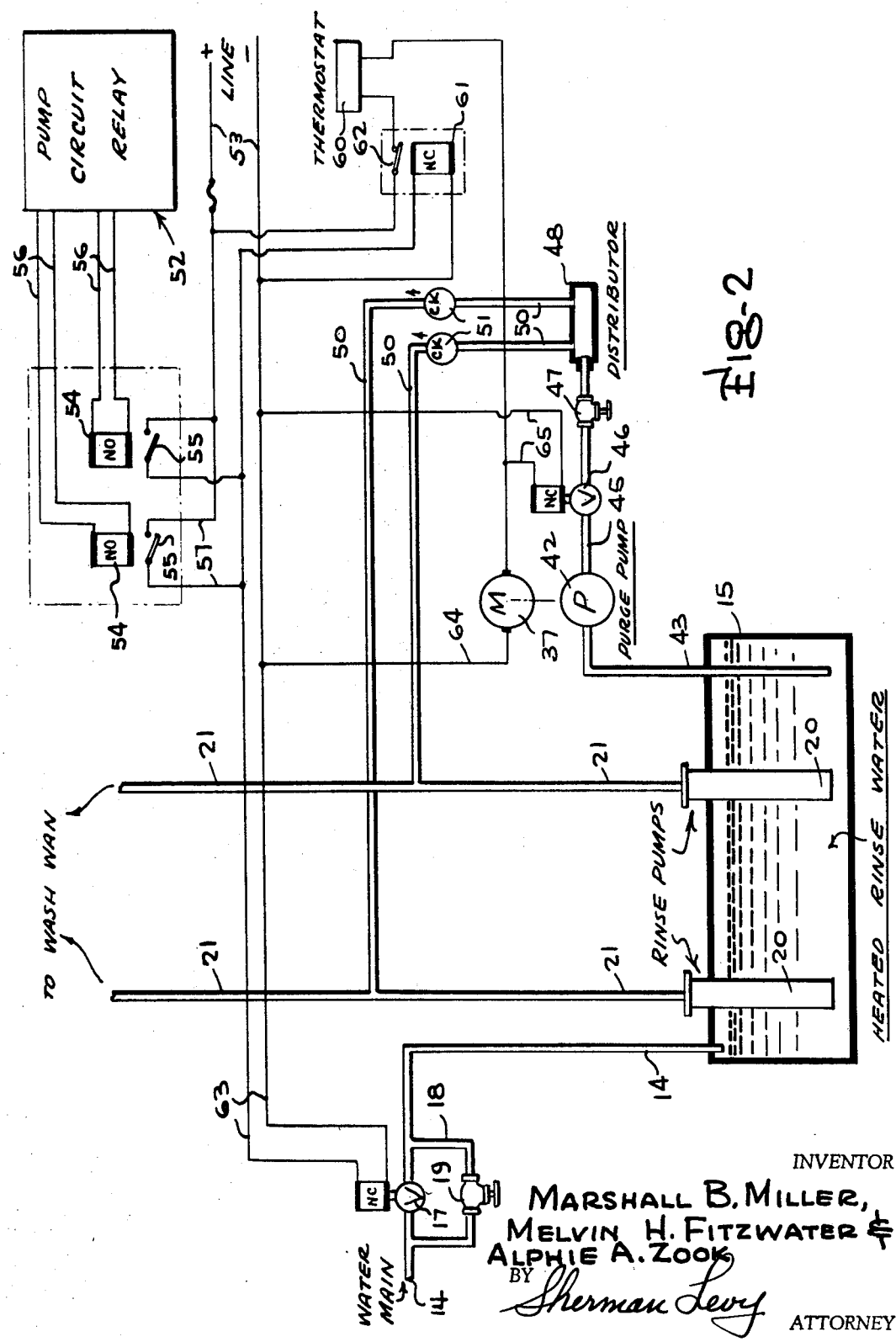
FIGURE 2 is a schematic view illustrating the present invention.
Figure 3:
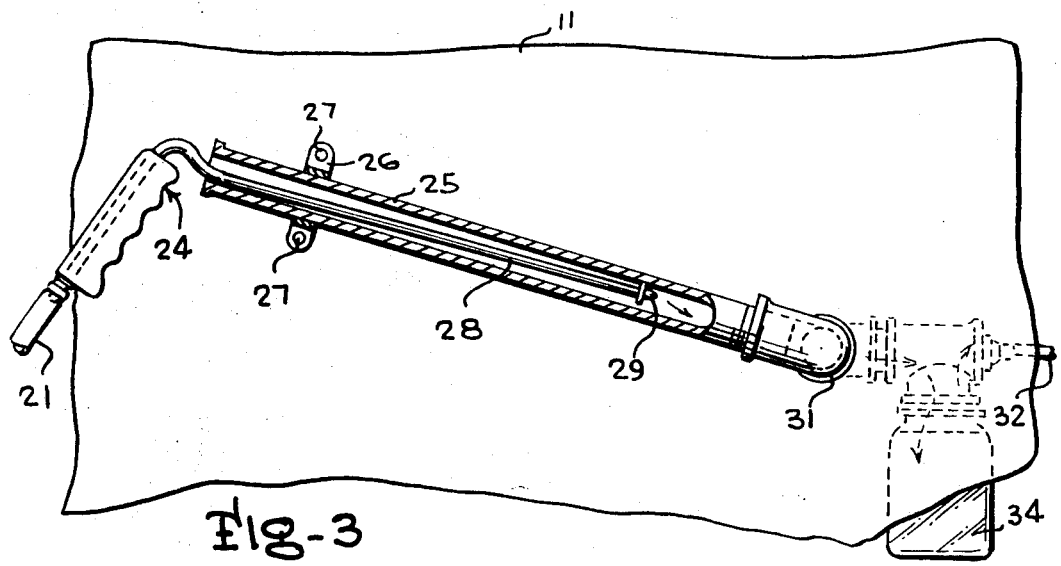
FIGURE 3 is an enlarged fragmentary sectional view showing certain constructional details of the wand or manually-operable car washing member.

Referring in details to the drawings, and more particularly to FIGURES 1, 2 and 3 of the drawings, there is illustrated a portion of a car wash system wherein the numeral 10 indicates a portion of an enclosure which may be defined by vertical walls or partitions such as the walls 11 and 12, and the numeral 13 indicates one or more stalls or bays for receiving vehicles such as automobiles which are to be washed. The present invention is especially useful with coin operated car wash systems but it is to be understood that the present invention is not limited to coin operated car wash systems and has application to various other types of establishments.

As shown in the drawings, the numeral 14 indicates a main supply line or conduit which is adapted to be connected to a suitable source of water supply such as a city water main or the like and the main supply line 14 serves to convey or transmit cold water to a wash or rinse tank or reservoir 15, FIGURES 1 and 2. The numeral 16 indicates a detergent tank which may be provided, and the detergent tank 16 together with its various accessories may be of conventional construction. The main supply line 14 has a normally closed solenoid valve 17 therein for a purpose to be later described. The numeral 18 indicates a by-pass line which is connected to the main supply line 14 around the valve 17, and the by-pass line 18 has a manually adjustable valve 19 therein.

The numeral 20 distinguishes each of a plurality of pump units which are arranged in communication with the heated rinse water in the tank 15, and the number of pump units 20 are adapted to correspond in number to the number of car wash bays 13 that are being used or provided. The numeral 21 indicates a conventional or existing conduit or water line for each of the pump units 20 and the water line 21 is operatively connected to a swivel mounting assembly 22 which may be suitably supported in any desired manner as, for example, the assembly 22 may be supported by an overhead rail or support member 30. The portion of the conduit 21 leading from the swivel mounting 22 is connected to a manually operable nozzle or wand 24 and the wand 24 is of the type that includes a rod-like member 28 having an apertured tip 29 thereon for the discharge therethrough of water. The numeral 25 indicates a sheath or hollow support element which is adapted to selectively receive the wand 24 when the wand 24 is not being used for washing a car or other vehicle. As shown in FIGURE 2, the sheath 25 is adapted to be arranged in an inclined manner and the sheath 25 is adapted to be affixed to a wall such as the wall 11 by means of hangers or clamps 26 which can be held in place by securing elements such as the screws or bolts 27.

The numeral 31 indicates a tubular member which may be suitably connected to the lower end of the sheath 25, and the tubular member 31 is adapted to extend through a suitable opening or hole 31 in the wall 11, and a gravity return line 32 is adapted to establish communication between the tubular member 31 and the wash tank 15. Fittings such as the fittings 44 may be suitably connected to the return line 32 so as to permit water to be returned from a plurality of sheaths 25 to the single wash tank or reservoir 15. A fitting 33 in the gravity return line 32 has a transparent bowl or jar 34 depending therefrom and the jar 34 is detachably connected thereto. As shown in FIGURE 1, for example, there is further provided an L-shaped bracket 35 which may be secured to a support such as the wall 11 in any suitable manner, as, for example, by means of securing elements 36. An electric motor 37 is supported on the horizontal portion of the bracket 34 and the motor 37 serves to drive a shaft 39 which has a pulley thereon, and an endless belt 40 is trained over the pulley on the shaft 39, and the belt 40 is also trained over a pulley or wheel-like member 41 which is operatively connected to a conventional water pump 42. The pump 42 may be suitably mounted below the bracket 35, and the motor 37 may be secured in place to the bracket 35 in any suitable manner such as by means of securing elements 38.

The numeral 45 indicates an outlet line which is connected to the pump device 42, and the outlet line 45 has a solenoid valve 46 and manually operable valve 47 connected thereto. The outlet line 45 leads to a sleeve like member 48 which provides or defines a pressure equalizer 48 and the pressure equalizer 48 may have a cap 49 on an end thereof. The numeral 50 indicates purge lines or tubes which are connected to the pressure equalizer 48 and it is to be understood that the number of purge lines 50 corresponds to the number of bays in the installation and purge lines 50 communicate with the water lines or conduits 21. Each of the purge lines 50 is adapted to have a check valve 51 therein.

As shown in FIGURE 2 there is indicated schematically a wiring diagram for the present invention and wherein the numeral 52 indicates a pump circuit relay or control unit, and the numeral 53 indicates input lines or wires which are adapted to be used for supplying electrical energy from a suitable source of supply. There is further provided normally open relays 54 corresponding in numbe to the number of bays, and the relays 54 have switches 55 associated therewith, and the numerals 56 and 57 indicate wires or conductors for electrically connecting these parts into the electrical circuit. As shown in FIGURE 1 for example suitable housings or boxes 58 or 59 can be provided for housing certain of the electrical components. The numeral 60 indicates a thermostat which has a normally closed relay 61 electrically connected thereto, and a switch 62 is associated with the normally closed relay 61.

The numerals 63, 64 and 65 indicate wires or conductors which are adapted to be used for electrically connecting elements such as the solenoid valve 17, pump motor 37, and solenoid valve 46 into the electrical circuit.

Figure 4:
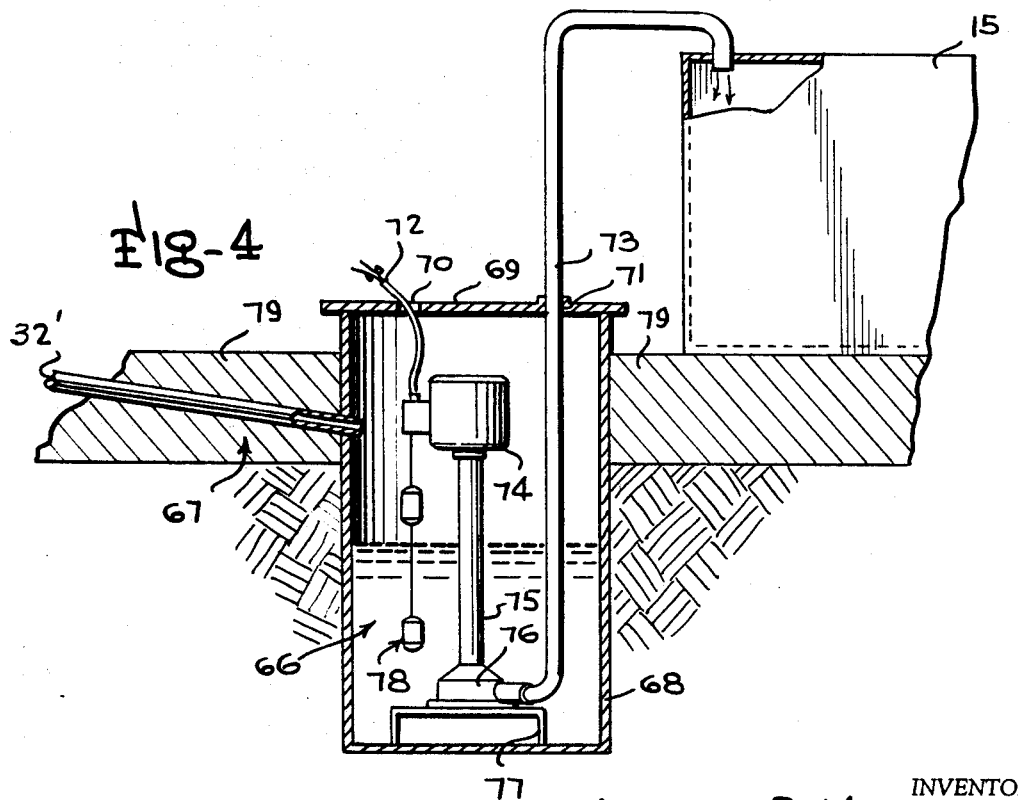
FIGURE 4 is a fragmentary, vertical, sectional view illustrating a modification.

Attention is now directed to FIGURE 4 of the drawings wherein there is illustrated a slightly modified or alternative arrangement which is especially suitable for use in installations which have more than two bays therein. In FIGURE 4 the numeral 32' indicates a return line corresponding generally in construction and function to the previously described return line 32, and numeral 66 indicates a sump well in the floor of the mechanical room such as the room 10, there being a casing 68 having its upper portion extending up above the floor level as shown in the drawings. A cover 69 is mounted on the top of the casing 68, and the cover 69 is adapted to have openings or holes 70 and 71 therein for the projection therethrough of wires 72 and a discharge line 73 which leads to the wash tank 15. The wires 72 are adapted to be connected to a suitable source of electrical energy and the wires 72 are also connected to an electric motor 74 which is used for operating a sump pump 76 through the medium of a shaft arrangement 75, and the sump pump 76 is supported on an open rack 77. The numeral 78 indicates a control assembly for the motor 74.

From the foregoing, it will be seen that there has been provided a purge system for a car wash apparatus which operates automatically to prevent freezing of the lines and parts during sub-freezing weather conditions, and, in addition, the present invention serves to return the hot water to the reservoir or wash tank so that important savings in cost of fuel or the like for heating the water is assured. In use, with the parts arranged as shown in FIGURES 1–3 of the drawings, cold water is adapted to be supplied from a source of supply through the main supply line 14 to the tank 15. The tank 15 can be arranged in a suitable location along with other accessories such as the detergent tank 16, and such tanks may be conveniently located in an area 10 which may be separated from the automobile wash bays or stalls 13 in any suitable manner as, for example, by means of walls 11. The tank 15 may be provided with the usual hot water heater so that when using the present invention in a coin-operated car wash system, upon insertion of a coin of the proper denomination, such as a quarter, the pump circuit relay 52 will be actuated to cause water to be pumped through the line 21, and then by removing the wand 24 from the sheath 25, water can be discharged through the tip 29 onto the car being washed. Parts such as the swivel mounting 22 are adapted to be of conventional construction and permit the wand to be readily shifted from place to place in order to assure that all parts of the car or other vehicle can be cleaned in the desired manner.

Operation of such washing systems heretofore have presented serious disadvantages especially in freezing weather conditions inasmuch as the parts and lines had a tendency to freeze, but with the automatic purge system of the present invention, freezing of the various components is automatically and positively eliminated. This is accomplished in a highly efficient and novel manner by means of the previously described structure. Thus there is provided the thermostat 60 which is adapted to be arranged in a suitable location so that the thermostat 60 is responsive to weather conditions, and hence when the atmospheric temperature drops below a certain level such as below freezing, the thermostat 60 will automatically actuate the various components of the present invention to achieve the desired results.

The parts can be made of any suitable material and in different shapes or sizes as desired or required.

When the temperature goes below freezing the thermostat 60 actuates a control mechanism, and electrical power is supplied through the hot lines of the power input 53 and power is supplied to the motor 37 which operates the pump device 42 by means of the previously described drive arrangement including the belt 40. Instead of using such a belt drive it is to be understood that other drive arrangements can be used such as intermeshing gears and the like. When the motor 37 is actuated the pump 42 is similarly started and the solenoid 46 is operated at the same time so that hot water is drawn or pumped out through the line 43, through the line 45 and into the distributor 48 and this hot water passes up through the line 50 and then through the upper portion of the line or conduit 21 and into and through the wand 24 and this water will then flow down through the inclined sheath 25 through the tubular connection 31 and then through the line 32 and back to the tank 15. It will therefore be seen that the hot water continues to flow through these parts as long as the thermostat 60 indicates that the atmospheric temperature is below freezing.

Initially, when a coin is inserted, the pump circuit relay or control unit 52 is actuated so that the pump units 20 are automatically energized or actuated when the coin is inserted. Thus, when a person is washing an automobile, it is not desired or necessary that the purge system be operative because the warm water being pumped by the pump units 20 will prevent the parts from freezing. Also, when a car is being washed, the water that is being used for washing the car does not return for reuse in as much as such water goes down the drain.

With the present invention, it will thus be noted that when a coin is inserted in the apparatus, the purge system of the present invention is automatically cut off, from the bay in use and when the coin is inserted the valve 17 is automatically open, to permit additional water from the water main 14 to replace the water that is used up.

Furthermore, there is provided the relays 54 which correspond in number to the number of bays in the installation so that as a coin is deposited the proper relay 54 will close, and as soon as this is done, power is supplied through a switch as, for example, switch 55 to thereby actuate the solenoid valve 17 to open the water line from the source of supply as indicated by the numeral 14. At the same time relay 61 is actuated and relay 61 is a normally closed relay to the purge system, and when relay 61 is actuated, it operates or actuates the switch 62 and as soon as this is done, the power to the entire purge system is cut off.

The present invention serves to therefore circulate hot water through the system during cold weather so as to prevent the lines from freezing up. In addition, the hot water is recirculated through the purge system back to the reservoir tank 15 so that such hot water is not washed. In the drawings in FIGURES 1 and 2, an apparatus has been shown for use with two bays but it is to be understood that if more than two bays such as three or four bays are to be used, then there will be three or four corresponding lines 50 and 21 together with corresponding accessories each with a number equal to the number of bays in the installation. The check valve 51 assures that the water can only flow in one direction through the lines 50, and as previously stated when the rod portion 28 is arranged in the sheath 25, the water runs down by gravity and returns to the tank 15. The sediment bowl 34 serves to collect debris or sediment and when the bowl 34 gets full the bowl 34 can be readily unscrewed and removed from the fittings 33 and can be cleaned and replaced thereafter.

The present invention is therefore a purge system for keeping the lines from freezing when the atmospheric temperature drops below freezing and the purge system only operates when the car wash system is not being used. In use, when the temperature drops below freezing, the thermostat 60 actuates the motor 37 and the solenoid 46 allowing the pump 42 to draw hot water from the tank 15 through the solenoid valve 46 and through the hand metering valve 47, then through the distributor 48, through the lines 50, through the check valves 51 and into the wash lines 21. From the wash lines 21 the water flows through the wand 24 and then flows by gravity through the sheath or receiver 25 and back into the tank 15 by gravity. When a coin is inserted, the control unit 52 is actuated which closes the normally open relays 54 which actuate the normally closed relay 61 to open the switch 62 and this cuts off the current to the entire purge system and at the same time opens the normally closed relay 17 to permit water from the main 14 to enter the tank 15. Thus the water is replaced in the tank that is used for washing the car.

The purge system of the present invention only operates when the temperature drops below freezing and thus is actuated by the thermostat 60.

In the modification of FIGURE 4 there is illustrated an alternative means for returning water from the purge system wherein the return line 32' receives water in the same manner as the previously described line 32, and when the water in the well 66 reaches a certain level, the control unit 78 causes the motor 74 to be actuated which operates the pump 76 to pump the water from the well 66 back to the tank 15. The present invention is economical to operate because the water that is used for the purge system goes back to the tank so that the costs of heating the water and utilizing the same are minimized.

The present invention thus incorporates a water purge system controlled by pump, relays, solenoids, and thermostats and the mechanism operates automatically. An important advantage of the present invention is that in winter weather the purge system returns the water to a central position for reuse so as to save all of the water. The present invention can be used with any car wash system and permits year-round operation in sub-freezing climate by preventing freezing and by saving the water used in the purge system, because the warm water is returned for reuse and there is a saving of fuel.

FIGURES 1–3 illustrate a two-bay gravity return system while FIGURE 4 illustrates an arrangement for use with more than two bays with gravity return to the sump pump and a sump pump for return to the wash tank. The present invention provides a no-freeze purge system for car wash stations wherein hot water is pumped from the wash level through regular wash lines, wand and nozzle and this water is then returned from the wand sheath to the wash reservoir for reuse. Certain of the parts such as the motor 37, tank 15 and the like can be positioned in the mechanical room or area 10. The pressure equalizer 48 has nipples or lines 50 extending therefrom corresponding in number to the number of car wash bays. The motor 37 is energized by a relay when a thermostat 60 (having an outside temperature tube) calls for the purge to operate. There is also provided the normally closed solenoid valve 17 in the main water supply which keeps the main water supply cut off while the purge operates, and there is provided a by-pass pipe or line 18 around the solenoid valve 17 and a hand valve 19 is positioned in the by-pass 18 for use in emergencies.

A relay control box is adapted to have the previously described relay for the purge system arranged therein, and such a box may also have therein a normally open relay for each car wash bay. This control box may be mounted adjacent to the regular car wash control box and such boxes are indicated by the numerals 58 and 59 in FIGURE 1. These normally open relays are wired so that, when a coin is inserted to start a wash cycle by a customer, the pump circuit will energize one of the normally open relays to close the circuit to the solenoid 17 in water main 14 and thus open water flow to tank or reservoir 15. This closed relay circuit will also energize the purge system relay which will open the circuit to the purge pump motor 37 and thus stop the purge system from operating. Also, after a customer has finished, the solenoid 17 on water main 14 will again close, and the purge system will function as before, until thermostat 60 turns it off due to outside temperature rise to a safe level, such as above freezing.

An important aspect or feature of this system is its water-saving set up. The water is saved for reuse by being returned to wash tank 15. This feature will also save fuel because the returned water is much warmer than the water from main supply source. This water return can be accomplished by either of two methods: (1) return by gravity, as shown in FIGURES 1–3, or (2) return to well in mechanical room floor to be pumped into wash tank by an immersion sump pump, as shown in FIGURE 4.

When the gravity method is being used, a nipple or tubular member 31 is extended through the wall 11 of the mechanical room at a point approximately 3″ higher than the point of entry for gravity return line to wash tank. The glass jar 34 becomes a visible sediment bowl. The line or tubing 32 is installed on gravity grade to the wash tank 15.

The conduit or sheath is adapted to be secured to the outside of wall 11 with the open end approximately 8″ higher than the other end. The conduit, or sheath 25 is adapted to be mounted a few inches away from wall 11 to allow hand freedom when wash wand is placed into sheath 25 when not in use. The gravity return system is preferred for a two-bay station.

On stations larger than a two-bay installation, preferably, the water is returned from wand sheath on gravity grade by underground through pipe 32' which is made of a non-corrosive material, to the sump well 66 in the floor 79 of mechanical room 10. This well may have a casing 68 made of a suitable material such as terra cotta that will extend approximately 4″ above floor level to avoid surface material from washing in. This well is adapted to have a cover 69 with holes 70 & 71 for discharge line 73 to wash tank 15 and for cord 72 for supplying current to sump pump 76. The sump pump 76 is supported by an open rack 77 approximately 4" from bottom of well to allow for sediment collection.

Although the invention has been herein shown and described in what is conceived to be the most practical and preferred embodiment, it is recognized that departures may be made therefrom within the scope of the invention, which are not to be limited to the details disclosed herein but are to be accorded the full scope of the claims so as to embrace any and all equivalent devices and apparatus.

What is claimed is:

1. In a coin operated car wash apparatus including a main water supply line and a reservoir tank, a purge system for preventing freezing of the parts of the car wash apparatus, means for cutting off the supply of water from the main supply line to the reservoir tank when the purge system is operating and means for stopping the operation of the purge system by opening the main supply line when the car wash apparatus is actuated by coin control means.

2. In a vehicle washer an enclosure including vertically disposed walls, and at least one stall providing a bay, a wash tank in said enclosure, a main water supply line connected to said tank and having a normally closed solenoid valve therein, a by-pass pipe connected to main supply line around said solenoid valve, and said by-pass pipe having a hand valve therein, pump units connected to said wash tank and corresponding in number to the number of bays, water lines connected to said pump units, a swivel mounting for said water lines, a wash wand connected to each wash line and said wand including a discharge tip, an inclined sheath affixed to one of said walls for selectively receiving a wand, a tubular member connected to the lower end of said sheath and extending through said one wall, a gravity return line operatively connecting said tubular member to said wash tank, a transparent bowl detachably connected in said return line, a bracket affixed to said one wall, a motor supported on said bracket, a pump device driven by said motor, a conduit member having one end connected to said pump device and its other end connected to said wash tank, an outlet line connected to said pump device, a solenoid valve and a manually operable valve in said outlet line, a pressure equalizer connected to said outlet line, purge lines connected to said pressure equalizer and to said water lines and having check valves therein, an electrical circuit including a relay control unit, a plurality of normally open relays corresponding in number to the number of bays and said relays being electrically connected to said relay control unit, a thermostat and a normally closed relay in said circuit, and conductors electrically connecting said motor and the solenoid valve in the main supply line into said circuit.

3. For use with a car washing station having more than two bays, a wand sheath, a return line adapted to be operatively connected to the wand sheath, a sump well, a casing for said well and said casing having its upper portion extending slightly above floor level, an apertured cover on said casing, a discharge line extending through said cover and adapted to be connected to a wash tank, a motor operated sump pump in said well, a rack for supporting said sump pump.

4. In a washing apparatus, a wash tank, a main supply line connected to said tank and having a normally closed solenoid valve therein, a by-pass line connected to said supply line around said solenoid valve, and said by-pass line having an adjustable valve therein, at least one pump unit connected to said tank, a water line connected to said pump unit, a wash wand connected to said water line, a sheath for selectively receiving said wand, a water return line operatively connecting said sheath to said tank, a purge system including an inlet conduit connected to said tank, a motor operated pump device connected to said inlet conduit, an outlet conduit connected to said pump device and said outlet conduit having a solenoid valve and a manually operable valve therein, a pressure equalizer, at least one line connecting said pressure equalizer to said water line and said last named line having a check valve operatively connected to said purge mechanism.

5. In a car wash apparatus of the coin operated type, a wash tank, means for selectively supplying water to said tank, wand means for selectively receiving water from said tank, and purge means for recirculating the water back to the tank when the car wash apparatus is not being used, said purge means only operating when the atmospheric temperature is below a certain level such as below freezing, and means for interrupting the supply of water to the tank when the purge system is in operation, and means for stopping operation of the purge system when the coin operated car wash apparatus is being used to wash a car.

References Cited

UNITED STATES PATENTS

| | | | |
|---|---|---|---|
| 3,207,165 | 9/1965 | Durrant | 134—123 XR |
| 3,229,703 | 1/1966 | Thompson et al. | 134—123 XR |
| 3,265,087 | 8/1966 | Livingston | 137—560 |

OTHER REFERENCES

National Pride Inc., advertising pamphlet, received in Patent Office group 470 on Mar. 13, 1965, 134—123.

R. L. BLEUTGE, *Primary Examiner.*